(12) United States Patent
Maehira (10) Patent No.: US 8,379,280 B2
(45) Date of Patent: Feb. 19, 2013

(54) IMAGE PROCESSING DEVICE AND SYSTEM FOR GENERATING CODED IMAGE DATA

(75) Inventor: Hirotoshi Maehira, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 550 days.

(21) Appl. No.: 12/707,946

(22) Filed: Feb. 18, 2010

(65) Prior Publication Data

US 2010/0214618 A1     Aug. 26, 2010

(30) Foreign Application Priority Data

Feb. 23, 2009   (JP) ................................ 2009-039695

(51) Int. Cl.
*H04N 1/46* (2006.01)
(52) U.S. Cl. ....... 358/539; 358/1.9; 358/3.01; 358/3.12; 358/426.04; 358/426.05; 358/3.06
(58) Field of Classification Search .................... None
See application file for complete search history.

(56) References Cited

U.S. PATENT DOCUMENTS

| | | | |
|---|---|---|---|
| 7,125,091 B2 * | 10/2006 | Huang et al. ................... | 347/15 |
| 7,308,150 B2 * | 12/2007 | Yokose ......................... | 382/245 |
| 7,813,007 B2 * | 10/2010 | Kakutani ....................... | 358/3.13 |
| 7,924,464 B2 * | 4/2011 | Kakutani ....................... | 358/3.01 |
| 7,957,031 B2 * | 6/2011 | Kakutani ....................... | 358/3.01 |
| 8,023,151 B2 * | 9/2011 | Kakutani ....................... | 358/3.01 |
| 2006/0215227 A1 * | 9/2006 | Kakutani ....................... | 358/3.01 |
| 2008/0239351 A1 * | 10/2008 | Yada ............................. | 358/1.9 |

FOREIGN PATENT DOCUMENTS

| | | |
|---|---|---|
| JP | 5-76001 | 3/1993 |
| JP | 11-17946 | 1/1999 |
| JP | 2004-295765 | 10/2004 |
| JP | 2006-129406 | 5/2006 |

\* cited by examiner

*Primary Examiner* — Dung Tran
(74) *Attorney, Agent, or Firm* — Scully, Scott, Murphy & Presser, PC (57) ABSTRACT

An image processing device to generate coded image data, which represents an image to be printed in a printing apparatus, is provided. The image processing device includes a data generator to downscale tone values of pixels included in the image, the tone values of pixels being included in a predetermined scale range, and assign a plurality of types of codes having different lengths to the downscaled tone values to generate image data, and a data transmitter configured to transmit the coded image data to the printing apparatus. The data generator downscales the tone values of pixels by classifying each tone value of pixels into one of segments, which are unevenly delimited by predetermined thresholds within the predetermined scale range and include a larger segment and a smaller segment, and assigning a code with a shorter bit length to the tone value classified into the larger segment.

14 Claims, 7 Drawing Sheets

| | GLOSS PAPER # 1 | GLOSS PAPER # 2 | ALL-PURPOSE PAPER |
|---|---|---|---|
| NO DOT | 0 ≤ VALUE ≤ 31<br>CODE: 1010B | 0 ≤ VALUE ≤ 31<br>CODE: 1010B | 0 ≤ VALUE ≤ 79<br>CODE: 00B |
| SMALL DOT | 32 ≤ VALUE ≤ 111<br>CODE: 00B | 32 ≤ VALUE ≤ 63<br>CODE: 1011B | 80 ≤ VALUE ≤ 111<br>CODE: 1010B |
| MEDIUM DOT | 112 ≤ VALUE ≤ 191<br>CODE: 01B | 64 ≤ VALUE ≤ 143<br>CODE: 00B | 112 ≤ VALUE ≤ 143<br>CODE: 1011B |
| LARGE DOT | 192 ≤ VALUE ≤ 223<br>CODE: 1011B | 144 ≤ VALUE ≤ 223<br>CODE: 01B | 144 ≤ VALUE ≤ 175<br>CODE: 1110B |
| EXTRA-LARGE DOT | 224 ≤ VALUE ≤ 255<br>CODE: 1110B | 224 ≤ VALUE ≤ 255<br>CODE: 1110B | 176 ≤ VALUE ≤ 255<br>CODE: 01B |

FIG. 1

| | GLOSS PAPER #1 | GLOSS PAPER #2 | ALL-PURPOSE PAPER |
|---|---|---|---|
| NO DOT | 0 ≤ VALUE ≤ 31<br>CODE: 1010B | 0 ≤ VALUE ≤ 31<br>CODE: 1010B | 0 ≤ VALUE ≤ 79<br>CODE: 00B |
| SMALL DOT | 32 ≤ VALUE ≤ 111<br>CODE: 00B | 32 ≤ VALUE ≤ 63<br>CODE: 1011B | 80 ≤ VALUE ≤ 111<br>CODE: 1010B |
| MEDIUM DOT | 112 ≤ VALUE ≤ 191<br>CODE: 01B | 64 ≤ VALUE ≤ 143<br>CODE: 00B | 112 ≤ VALUE ≤ 143<br>CODE: 1011B |
| LARGE DOT | 192 ≤ VALUE ≤ 223<br>CODE: 1011B | 144 ≤ VALUE ≤ 223<br>CODE: 01B | 144 ≤ VALUE ≤ 175<br>CODE: 1110B |
| EXTRA-LARGE DOT | 224 ≤ VALUE ≤ 255<br>CODE: 1110B | 224 ≤ VALUE ≤ 255<br>CODE: 1110B | 176 ≤ VALUE ≤ 255<br>CODE: 01B |

IMAGE PROCESSING DEVICE AND SYSTEM FOR GENERATING CODED IMAGE DATA

CROSS REFERENCE TO RELATED APPLICATION

This application claims priority from Japanese Patent Application No. 2009-039695, filed on Feb. 23, 2009, the entire subject matter of which is incorporated herein by reference.

BACKGROUND

1. Technical Field

An aspect of the present invention relates to an image processing device capable of generating image data, which represents an image to be printed in a printing apparatus, and a computer readable storage medium therefor.

2. Related Art

A method called entropy coding, which is one of methods to compress image data, is known. According to the coding method, values frequently occurring in the image data are assigned short codes so that the frequently-occurring values are represented by the short codes in the image data and a volume of the image data is downsized.

SUMMARY

Image data generated in an image data generating apparatus (e.g., a personal computer) is often transmitted in a serial communication line to a printing apparatus to be printed. When the image data is transmitted, it is preferable that a volume of the image data is smaller so that the data transmission can be conducted in a shorter period of time. Nevertheless, downsizing the volume of the image data upon transmission from the image data generating apparatus to the printing apparatus by assigning short codes to pixels has not been taken into indeed consideration.

In view of the shortage in consideration, therefore, the present invention is advantageous in that an image processing device, which is capable of downsizing a volume of image data to be serially transmitted to a printing apparatus effectively, is provided. Further, a computer readable storage medium for the image processing device is provided.

According to an aspect of the present invention, an image processing device capable of generating coded image data, representing an image to be printed in a printing apparatus, is provided. The image processing device includes a data generator configured to downscale tone values of pixels included in the image in a half process, the one values of pixels being included in a predetermined range, and assign a plurality of types of codes having different lengths to the downscaled tone values to generate coded image data, which describes the downscaled tone values in the different types of codes, and a data transmitter configured to transmit the coded image data to the printing apparatus. The data generator downscales the tone values of pixels in the image by classifying each tone value of pixels into one of segments, which are unevenly delimited by predetermined thresholds within the predetermined range inclusive of the tone values of pixel and include a larger segment and a smaller segment, and assigning a code with a shorter bit length to the tone value classified into the larger segment.

According to another aspect of the present invention, an image processing system including an image processing device to generate coded image data representing an image to be printed and a printing apparatus to print the image according to the coded image data generated in the image processing device is provided. The image processing device includes a data generator configured to downscale tone values of pixels included in the image in a halftoning process, the tone values of pixels being included in a predetermined scale range, and assign a plurality of types of codes having different lengths to the downscaled tone values to generate coded image data, which describes the downscaled tone values in the different types of codes, and a data transmitter configured to transmit the coded image data to the printing apparatus. The data generator downscales the tone values of pixels in the image by classifying each tone value of pixels into one of segments, which are unevenly delimited by predetermined thresholds within the predetermined range inclusive of the tone values of pixels and includes a larger segment and a smaller segment, and assigning a code with a shorter bit length to the tone value classified into the larger segment. The printing apparatus includes a data receiver to receive the coded image data transmitted by the data transmitter, a decoder to decode the coded image data described in the different types of codes with reference to decoding information, indicating correspondence between the tone values and the codes to be assigned to the tone values, and a printer unit to form the image according to the decoded image data.

According to another aspect of the present invention, a computer readable medium storing computer readable instructions that controls a computer to process an image is provided. The computer readable instructions controls the computer to execute steps of downscaling tone values of pixels included in the image and assigning a plurality of types of codes having different lengths to the downscaled tone values to generate coded image data, which describes the downscaled tone values in the different types of codes, the tone values of pixels being included in a predetermined scale range, and transmitting the coded image data to the printing apparatus. The tone values of pixels in the image is downscaled by classifying each tone value of pixels into one of segments, which are unevenly delimited by predetermined thresholds within the predetermined scale range inclusive of the tone values of pixels and includes a larger segment and a smaller segment, and assigning a code with a shorter bit length to the tone value classified into the larger segment.

According to the above image processing device, image processing system, and the computer readable medium, the image data, in which the downscaled tone values included in the larger segments are assigned to have the shorter codes with the shorter bit length, is generated. In this regard, the downscaled tone values included in the larger segments are likely to occupy a larger area in the image. Therefore, a total volume of the image data to be transmitted to the printing apparatus can be effectively downsized. Accordingly, the image data can be transmitted to the printing apparatus in a shorter period of time.

DETAILED DESCRIPTION

Hereinafter, embodiments according to the present invention will be described with reference to the accompanying drawings.

Figure 1:
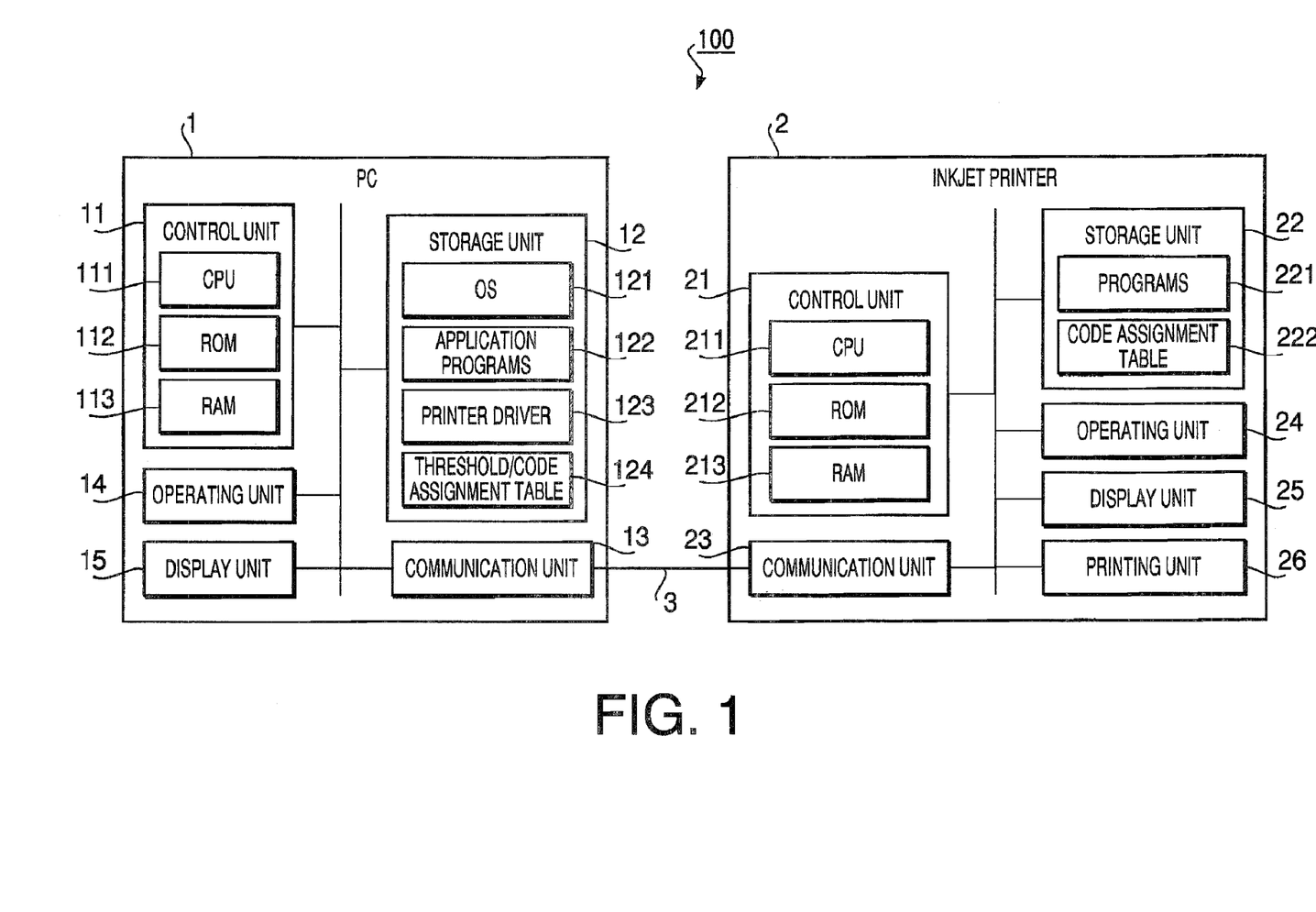
FIG. 1 is a block diagram to illustrate a communication system according to a first embodiment of the present invention.

Firstly, a communication system 100 according to a first embodiment will be described. As shown in FIG. 1, the communication system 100 includes a personal computer (PC) 1 and an inkjet printer 2, which are connected to each other via a serial bus 3 (e.g., a USB cable) for data exchange.

The PC 1 is an information processing apparatus having a control unit 11, a storage unit 12, a communication unit 13, an operating unit 14, and a display unit 15.

The control unit 11 controls overall behaviors of the PC 1 and includes a CPU 111, a ROM 112, and a RAM 113.

The storage unit 12 is a rewritable nonvolatile memory device, such as a hard disk drive. In the storage unit 12, an operating system (OS) 121 and various programs are installed. The programs include application programs 122 (e.g., image browser software) to implement applications and a printer driver 123 being a software program to manipulate the inkjet printer 2 through the PC 1. Further, the storage unit 12 stores various data therein. For example, a threshold/code assignment table 124, which is referred to when the printer driver 123 is activated in the PC 1, is stored in the storage unit 12. Behaviors of the PC 1 according to the printer driver 123 will be described later in detail.

The communication unit 13 provides the PC 1 with an interface to communicate with the inkjet printer 2 through the serial bus 3 for data exchange (i.e., serial communication).

The operating unit 14 is an input device, through which a user enters instructions to manipulate the PC 1. The operating unit 14 includes a keyboard and a pointing device (e.g., a mouse and a touch-sensitive pad).

The display unit 15 is an output device to display images representing various kinds of information to be viewed by the user. The display unit 15 includes a liquid crystal display (LCD).

The inkjet printer 2 is a printing apparatus to print an image in ink-jetting and includes a control unit 21, a storage unit 22, a communication unit 23, an operating unit 24, a display unit 25, and a printing unit 26.

The control unit 21 controls overall behaviors of the inkjet printer 2 and includes a CPU 211, a ROM 212, and a RAM 213.

The storage unit 22 is a rewritable nonvolatile memory device, such as a flash memory. In the storage unit 22, various programs such as programs 221 to have the CPU 211 to execute a printing operation are stored. Further, a code assignment table 222, which is to be referred to in the printing operation, is stored in the storage unit 22.

The communication unit 23 provides the inkjet printer 2 with an interface to communicate with the PC 1 through the serial bus 3 for data exchange (i.e., serial communication).

The operating unit 24 is an input device, through which a user enters instructions to manipulate the inkjet printer 2. The operating unit 24 includes operation buttons.

The display unit 25 is an output device to display images representing various kinds of information to be viewed by the user. The display unit 25 includes an LCD.

The printing unit 26 prints images in colors by ejecting colored inks, including cyan (C) ink, magenta (M) ink, yellow (Y) ink, and black (K) ink, onto a surface of a printing medium (e.g., a sheet of paper) according to image data, which represents colors of pixels in the image in values. In this regard, in order to form the colored images in ink drops with smooth gradation, the values representing sizes of ink drops to be placed in the pixels are scaled in three or more levels, rather than in a binary scale with two levels. According to the present embodiment, sizes of colored ink drops to be ejected are represented in a scale of five, which are "no dot," "small dot," "medium dot," "large dot," and "extra-large dot."

Next, operation to be performed in the communication system 100 according to the first embodiment will be described.

When an instruction to start printing to process a print job is entered by a user in the PC 1, the printer driver 123 is activated to process the print job. In particular, a dialog box, through which print settings can be modified, is presented to the user through the display unit 15 whilst an application program is running, and the user is prompted to modify the print settings if necessary. When the user enters an instruction to print an image processed in the application program, the modified print settings are entered, and the instruction is transmitted from the PC 1 to the inkjet printer 2. Accordingly, the inkjet printer 2 starts preparing for the image printing.

Meanwhile, in the PC 1, based on original image data (e.g., image data represented in 256-scaled RGB (red, green, blue) values) included in the print job, image data representing the image to be printed in the five-scaled values is generated. In particular, the 256-scaled RGB values in the original image data are converted into 256-scaled CMYK (cyan, magenta, yellow, black) values, which are reproducible in the CMYK inks in the inkjet printer 2. Thereafter, the tone values of the converted CMYK data in 256 scales are lowered to five-scaled tone values in a halftoning process. In the present embodiment, the 256-scaled CMYK values are downscaled in a random-dithering method.

The image data in five-scaled tone values, which represent sizes of dots included in the image, is thus generated and transmitted from the PC 1 to the inkjet printer 2. The inkjet printer 2 receiving the image data controls the printing unit 26 to eject the inks onto the recording sheet according to the image data. Thus, the image represented in the image data is formed in the CMYK inks.

In the above printing operation, if the image data is represented in four-scaled tone values, the four values can be represented in two-bit codec, which are, for example, 00B, 01B, 10B, 11B. In this regard, the alphabet "B" represents "binary." Meanwhile, if the image data is represented in scales of five, as represented in the present embodiment, the values cannot be represented in the two-bit codes due to shortage of digits. Therefore, the values may be represented in three-bit codes (e.g., 000B, 001B, 010B, 011B, 100B). It is noted that, when the values are represented in three-bit codes, a volume of the image data becomes noticeably greater than the image data represented in two-bit codes. Thus, the image data represented in three-bit codes may not necessarily be advantageous in view of serial data transmission from the PC 1 to the inkjet printer 2 via the serial bus 3.

Moreover, in information processing devices generally used, data is processed in a unit of n-th power of 2, which is for example 32 bits and 64 bits. Therefore, calculation of the image data in three-bit codes in the information processing devices may become complicated and require longer time. For example, when data is processed to be stored in a storage device by an ASIC, which is a hardware supportive circuit embedded in the inkjet printer 2, the data is required to be stored in a unit of n-th power of 2. Due to the restriction of the data structure, it is preferable that the image data in five-scaled tone values is represented in the unit of n-th power of 2. However, it is to be noted that simple conversion of the three-bit codes into four-bit codes should result the data size to grow even larger.

In consideration of the above constraints, in the present embodiment, the tone values in the halftone-dithered image data are coded in combination of two kinds of codes, which are two-bit codes (shorter codes) and four-bit codes (longer codes). Further, the tone values represented in two-bit codes and four-bit codes are compressed in the entropy coding method so that the volume of the image data is prevented from being increased and the image data can be processed efficiently in further calculations by the hardware-supportive circuit.

In the entropy coding, the volume of data is compacted by assigning the shorter codes to frequently-occurring values and the longer codes to less-frequently occurring values. Therefore, it is to be noted that frequency of each tone value in the image data requires to be detected prior to assignment of the codes. When frequency of each tone value is detected by the PC 1, wherein the image is divided in lines and the image data is generated and transmitted to the inkjet printer 2 on the line basis, so that the image is formed on the line basis by the inkjet printer 2 manipulating a recording head along the line, frequency of tone values in image data corresponding to one page of recording sheet is required to be examined in advance prior to transmission. When the image data is examined on basis of a page, subsequent processes are required to wait until completion of the examination, and an entire printing operation may take time and not be conducted efficiently.

In view of the inefficiency, in the present embodiment, the codes are assigned to the tone values in the image data based on probability of occurrence, which is obtained in accordance with a predetermined rule, rather than based on actual occurrences of the tone values detected in the image data for an entire page. In a random-dithering process, as conventionally known, one pixel among the pixels included in the image data is picked up to be a currently marked pixel sequentially, and a tone value of the marked pixel is compared with a predetermined value in order to determine a converted value and distribute a difference between the unconverted tone value and the converted tone value caused by the conversion to unprocessed surrounding pixels.

In the random-dithering process of the present embodiment, in which 256-scaled tone values are downscaled into five-scaled tone values, a tone value of the unconverted marked pixel, which is in a range between 0 and 255, is converted into one of five tone values. Each of the five tone values corresponds to one of five partitioned segments, which are in the range of 0-255. That is, the range of 0-255 is delimited by four thresholds into five segments. In the random-dithering method in the present embodiment, the five segments are not evenly divided, and a tone value corresponding to a larger segment is assigned to have a shorter code, whilst a tone value corresponding to a smaller segment is assigned to have a longer code. Thus, a tone value to represent pixels occupying a larger area in the halftone-dithered image data is assigned to have a shorter code, and a tone value to represent pixels occupying a smaller area in the halftone-dithered image is assigned to have a longer code.

In other words, the tone value which may stochastically occur more frequently is assigned to have a shorter code in the entropy coding. In the present embodiment, the shorter codes being two-bit codes include "00" and "01," and the longer codes being four-bit codes include "1010," "1011," and "1110." Further, tone values corresponding to a largest segment and a second largest segment among the five segments are assigned to have two-bit codes.

In the present embodiment, a most significant bit of each two-bit code indicates "0" whilst a most significant bit of each four-bit code indicates "1" at all time so that the two-bit codes and the four-bit codes are distinctly recognized by the most significant bits thereof in the codes. Moreover, a third-order bit in each four-bit code indicates "1" at all time so that it is recognized to be an error when the third-order bit in the four-bit code indicates "0." It is to be noted that figures in each code is not limited to those mentioned above.

Furthermore, in the present embodiment, codes to be assigned to the tone values are changed in between printing operations according to types of recording sheets to be used. Due to difference of ink-absorbability of different types of recording sheets, sizes of ink dots may require to be modified on basis of the type of recording sheets. Therefore, patterns of the thresholds which partition the range of 0-255 into the five segments in random-dithering are modified.

Figure 2:
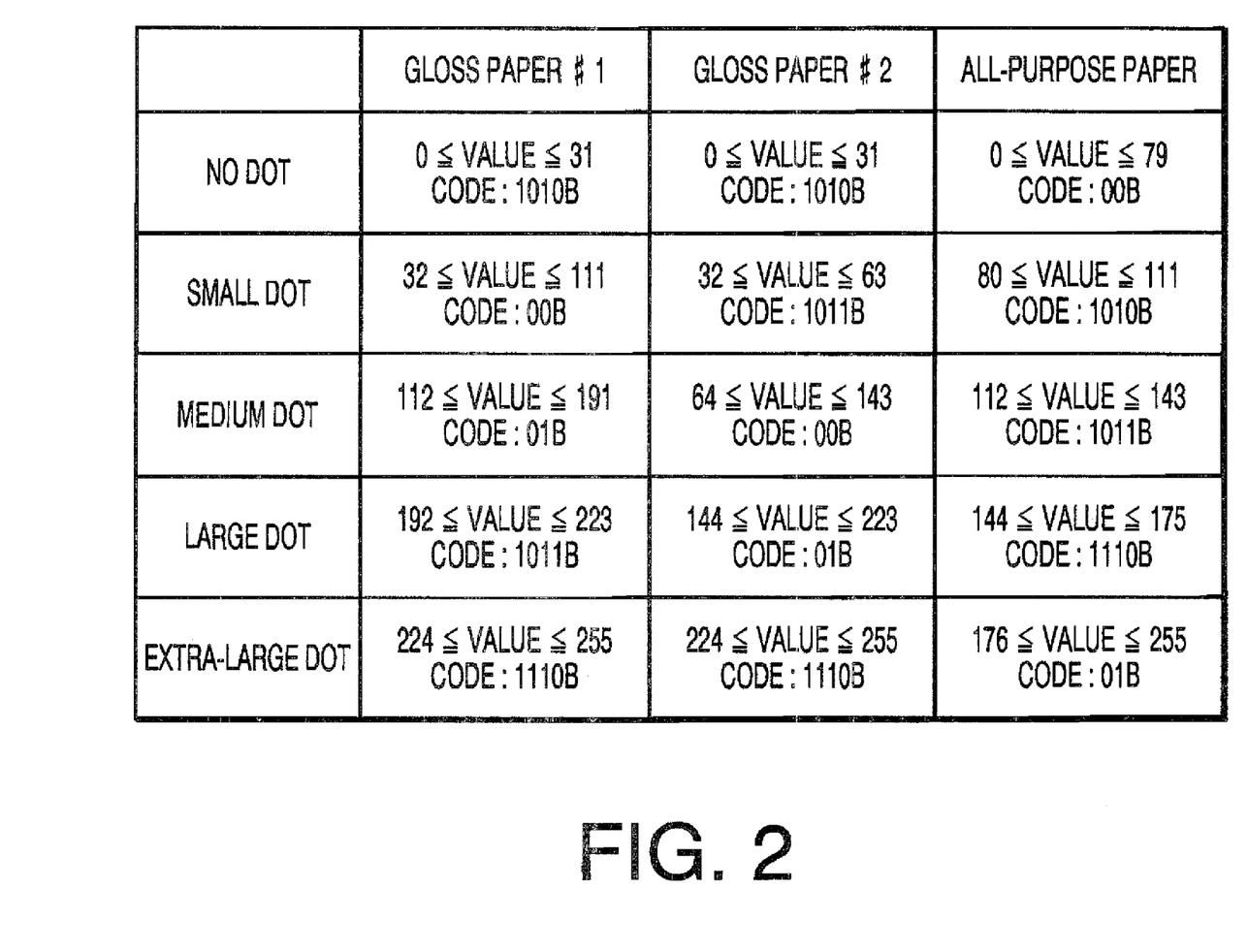
FIG. 2 illustrates a threshold/code assignment table according to the first embodiment of the present invention.

FIG. 2 illustrates a threshold/code assignment table 124, which is stored in the storage unit 12 of the PC 1. The threshold/code assignment table 124 indicates the patterns of the segments, which are defined by predetermined thresholds, and codes to be assigned to the tone values corresponding to the segments on basis of a type of the recording sheet. The types of the recording sheet include "gloss paper #1," "gloss paper #2," and "all-purpose paper." It is to be noted that codes also vary, in addition to the segment patterns, according to the type of the recording sheet due to variation of size relation among the segments. Indication "Value" in the threshold/code assignment table 124 refers to a tone value in 256 scales, which is not yet random-dithered.

For example, when the paper type "gloss paper #1" is designated in the dialog box for print settings, a pixel, whose tone value in 256 scales is included in a segment ranging from a threshold 0 to a threshold 31, is represented by no dot. A pixel, whose tone value is included in a segment ranging from 32 to 111, is represented by a small dot. Pixels, whose tone values are included in segments ranging from 112 to 191, from 192 to 223, and from 224 to 225 respectively, are represented by a medium dot, a large dot, and an extra-large dot. In this paper-type setting of "gloss paper #1", tone values included in the larger segments, which correspond to small dots and medium dots, are assigned to have shorter codes.

In the paper-type setting of "gloss paper #2," tone values included in the larger segments, which correspond to medium dots and large dots, are assigned to have shorter codes. In the paper setting of "all-purpose paper," tone values included in the larger segments, which correspond to no dot and extra-large dots, are assigned to have shorter codes. In other words, tone values included in a segment with a range of 80 are assigned to have two-bit codes, whilst tone values included in a segment with a range of 32 are assigned to have four-bit codes.

In the present embodiment, the code assignment table 222 stored in the storage unit 22 of the inkjet printer 2 solely contains codes to be assigned to the tone values on basis of a paper type out of the information contained in the threshold/ code assignment table 124. Namely, the threshold/code assignment table 124 and code assignment table 222 commonly contain information indicating correspondence between the tone values and codes to be assigned on basis of a paper type. Therefore, the inkjet printer 2 can recognize tone values corresponding to the codes, which are transmitted from the PC 1 and represent the image to be printed, when the inkjet printer 1 is notified of the paper type to be used in the print job. Thus, the control unit 21 of the inkjet printer 2 can decode the print data described in the codes with reference to the information in the code assignment table 222.

Next, behaviors of the PC 1 and the inkjet printer 2 to execute the processes described above will be described with reference to FIGS. 3 through 5.

A flow of driver's operation to be performed by the CPU 111 of the control unit 11 in the PC 1 according to the printer driver 123 will be described with reference to FIG. 3. The flow starts when the user manipulates the PC 1 to start a print operation. As has been described above, when the PC 1 is manipulated to start the printing operation, an instruction to start printing is transmitted from the PC 1 to the inkjet printer 2.

When the flow starts, in S101, the control unit 11 activates a reading operation, in which the threshold/code assignment table 124 is referred to and the thresholds defining the segments to be referred to in random-dithering and codes to be assigned to downscaled five-scaled tone values are read. Accordingly, the thresholds defining the segments for the tone values of the image and the codes to be assigned to the downscaled tone values for the designated paper type are obtained to be used in succeeding processes. The reading operation will be described later in detail.

In S102, the control unit 11 transmits a command concerning print settings, which indicates conditions to print the image, to the inkjet printer 2 so that the inkjet printer 2 recognizes the type of paper to be used in the print job.

In S103, the control unit 11 activates halftone-dithering and processes unprocessed line-image data, which represents the CMYK-converted image divided in lines, in the print job in the random-dithering method. Thus, the tone values in the line-image data are downscaled into five-scaled tone values.

In S104, each of the downscaled five-scaled tone values is assigned to have a code corresponding to the five-scaled value. In this regard, the codes obtained in the reading operation in S101 are referred to. Thus, print data described in the codes is generated.

In S105, the print data generated in S104 is transmitted to the inkjet printer 2. Accordingly, the inkjet printer 2 starts processing the print data to print the image.

In S106, the control unit 11 judges as to whether the inkjet printer 2 completed printing of all pages included in the print job. If an unprinted page remains (S106: NO), the flow returns to S103 and repeats S103-S106. If the inkjet printer 2 completed printing of all pages included in the print job (S106: YES), the driver's operation is ended.

Figure 4:
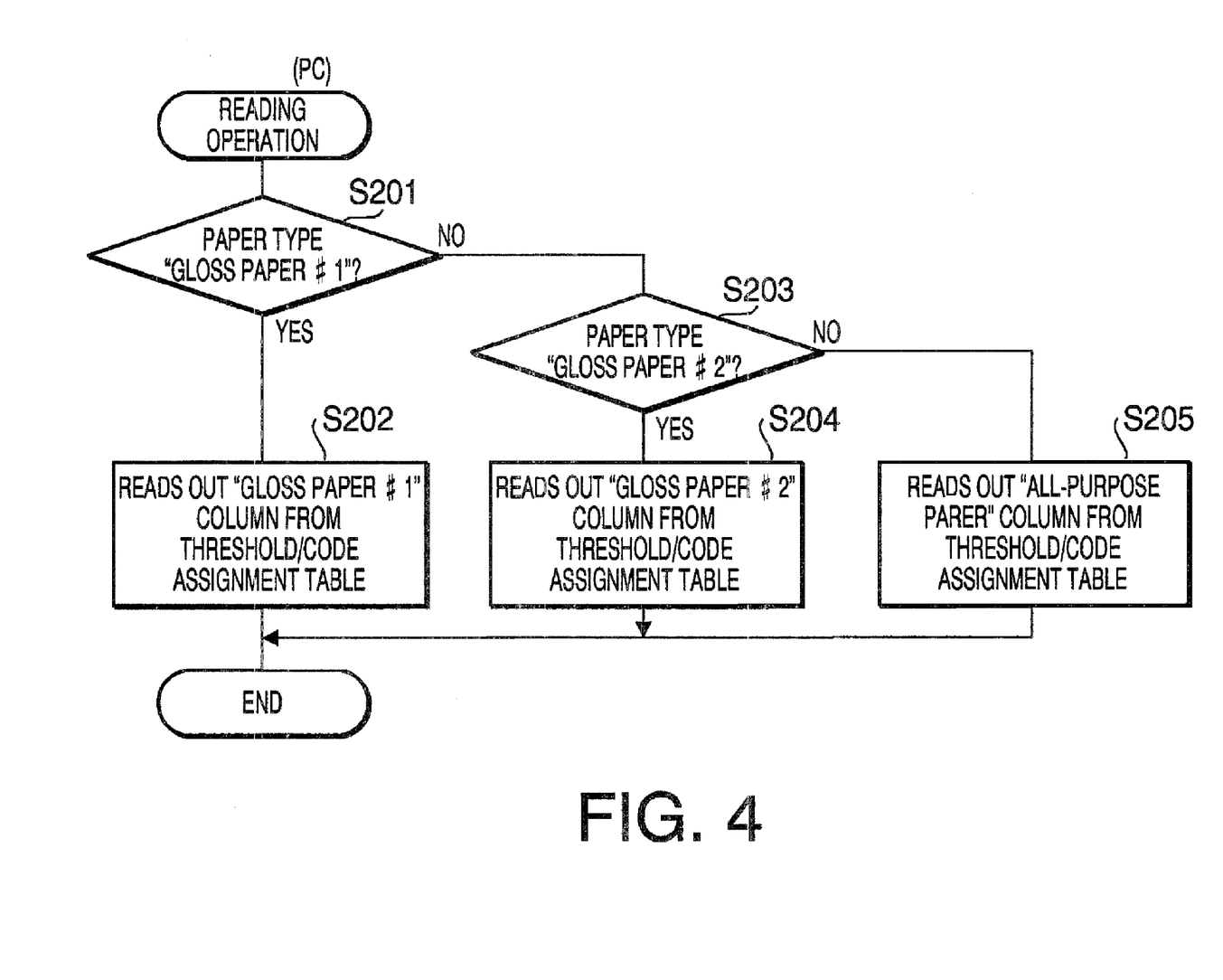
FIG. 4 is a flowchart to illustrate a flow of reading behaviors to read the threshold/code assignment table according to the first embodiment of the present invention.

Next, the reading operation to be performed in S101 will be described with reference to FIG. 4.

When the flow of the reading operation starts, in S201, the control unit 11 judges as to whether the paper type designated in the print settings is "gloss paper #1." If the designated paper type is "gloss #1" (S201: YES), in S202, the control unit 11 reads out the information described in the "gloss paper #1" column (see FIG. 2) in the threshold/code assignment table 124. Thus, the patterns of the segments defined by the thresholds and the codes to be assigned to the tone values corresponding to the segments for the paper type "gross paper #1" are read. The flow is ended thereafter. In 5201, if the designated paper type is not "gloss paper #1" (S201: NO), the flow proceeds to S203.

In S203, the control unit 11 judges as to whether the paper type designated in the print settings is "gloss paper #2." If the designated paper type is "gloss paper #2" (S203: YES), in S204, the control unit 11 reads out the information described in the "gloss paper #2" column (see FIG. 2) in the threshold/code assignment table 124. The flow is ended thereafter. In S203, if the designated paper type is not "gloss paper #2" (S203: NO), the flow proceeds to S205.

In S205, the control unit 11 reads out the information described in the "all-purpose paper" column (see FIG. 2) in the threshold/code assignment table 124. The flow is ended thereafter.

Figure 5:
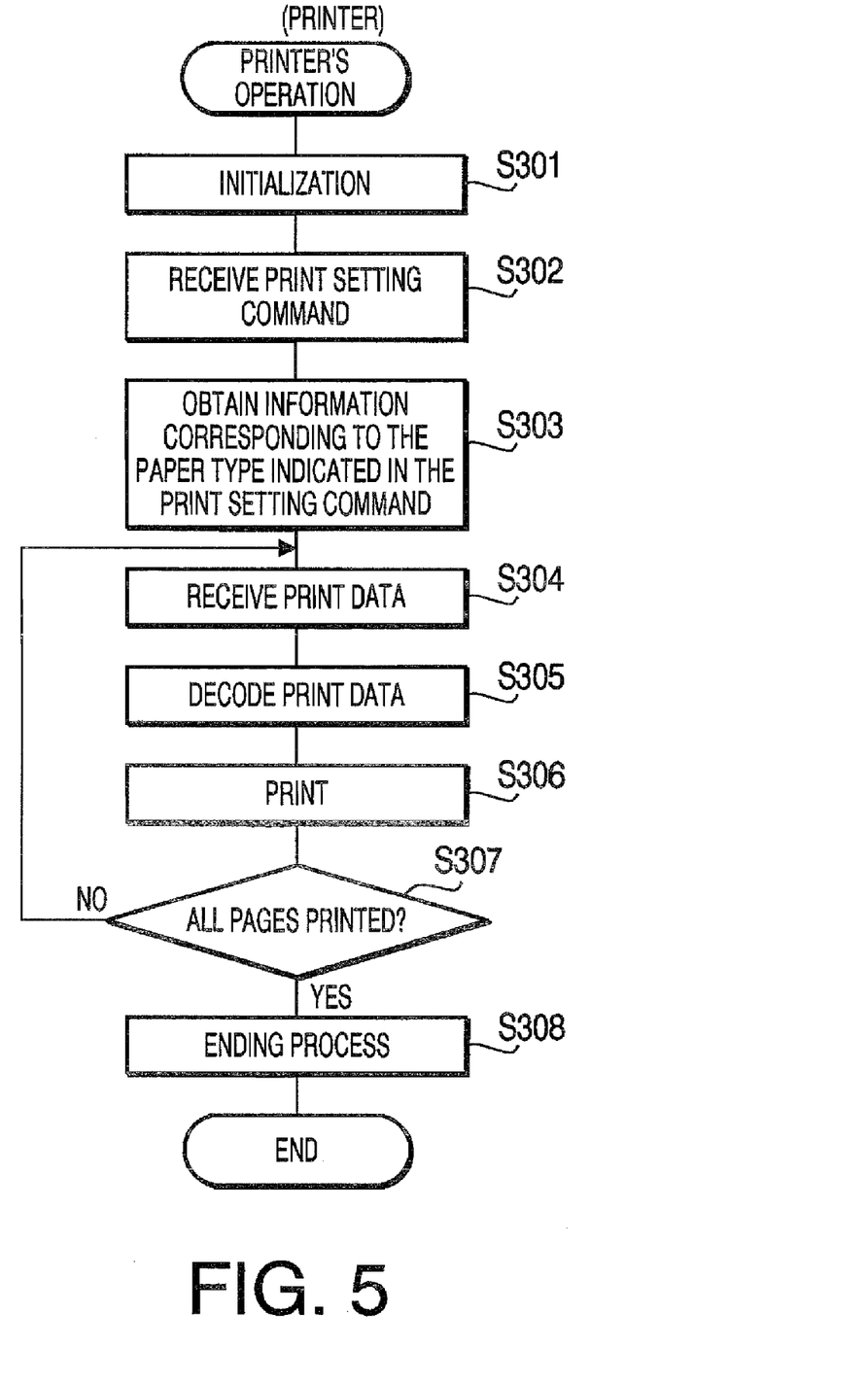
FIG. 5 is a flowchart to illustrate a flow of printer's behaviors according to the first embodiment of the present invention.

Next, a flow of printer's operation, which is executed by the CPU 211 in the control unit 21 of the inkjet printer 2, will be described with reference to FIG. 5. The flow starts when the instruction to start printing is transmitted from the PC 1 and received in the inkjet printer 2.

When the flow starts, in S301, the control unit 21 initializes the inkjet printer 1 and prepares for the print job.

Figure 3:
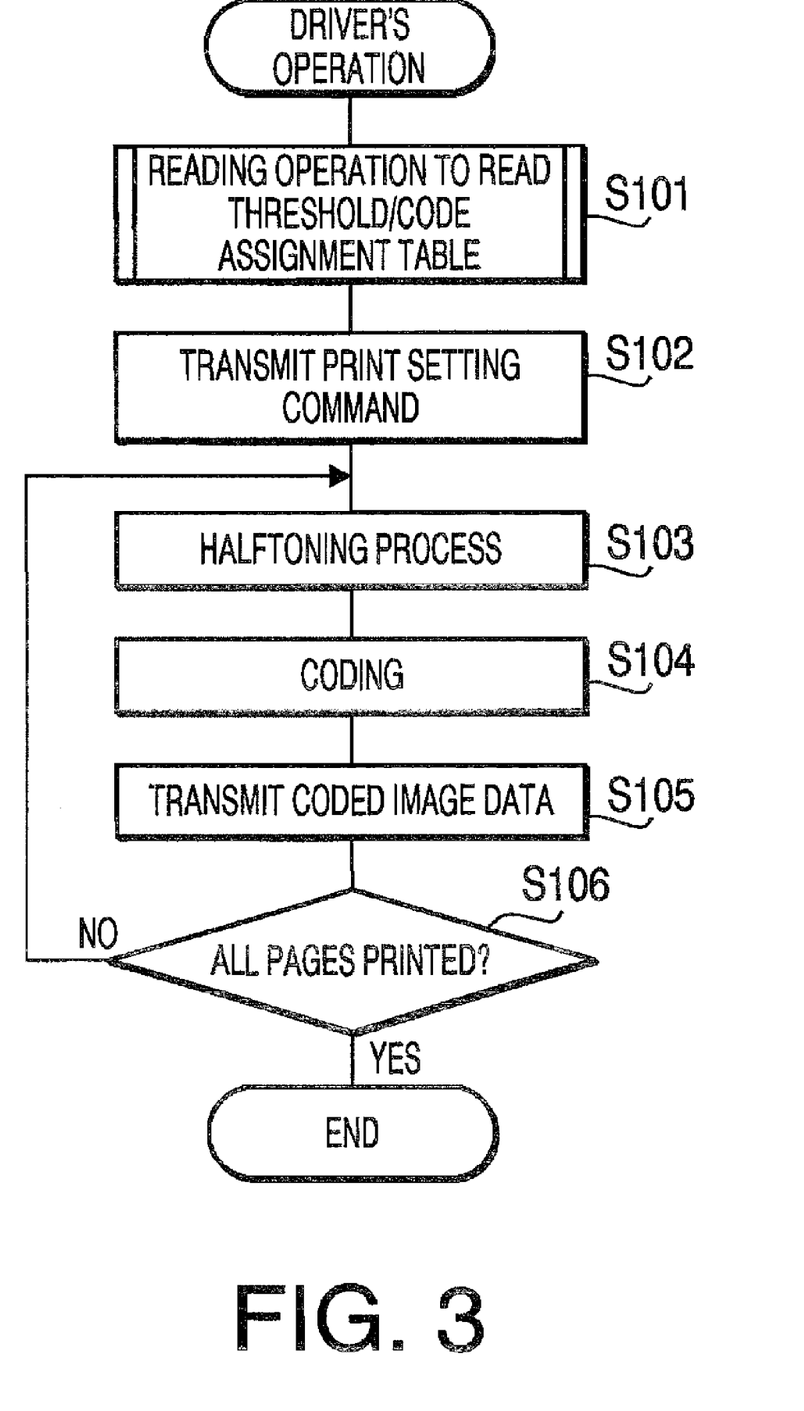
FIG. 3 is a flowchart to illustrate an operational flow of a PC according to a printer driver in the first embodiment of the present invention.

In S302, the control unit 21 receives the command concerning the print settings transmitted from the PC 1 (see S102 in FIG. 3).

In S303, the control unit 21 refers to the code assignment table 222 and obtains the information corresponding to the paper type for the print job, which is indicated in the command received in S302. Based on the obtained information, the print data, which is to be transmitted from the PC 1 (see S105 in FIG. 3), can be decoded.

In S304, the control unit 21 receives the print data transmitted from the PC 1. Further, the control unit 21 manipulates the communication unit 13 to insert data (e.g., start bits and stop bits) necessary to decode the received print data in the received print data.

In S305, the control unit 21 decodes the print data received in S304 based on the information obtained in S303.

In S306, the control unit 21 manipulates the printing unit 26 to form the image according to the decoded image data on the recording sheet.

In S307, the control unit 21 judges as to whether all pages included in the print job have been printed. If an unprinted page remains (S307: NO), the flow returns to S304 and repeats S304-S307. If all pages included in the print job have been printed (S307: YES), in S308, the control unit 21 executes an ending process. The flow is ended thereafter.

According to the communication system 100 described above, the PC 1 generates the print data, in which the halftone-dithered tone values included in the larger segments, which are defined by the predetermined thresholds, are assigned to have the shorter codes with the shorter bit length. Therefore, a volume of the print data to be transmitted to the inkjet printer 2 can be effectively downsized. Accordingly, the print data can be transmitted to the inkjet printer 2 in a shorter period of time.

According to the communication system 100 described above, further, the codes to be assigned to the halftone-dithered tone values are determined prior to transmission of the image data from the PC 1 to the inkjet printer 2, but analysis of the halftone-dithered image data entirely, in order to determine occupancy ratios of frequently-occurring tone values and less-frequently-occurring tone values with respect to the entire image data, is not necessary. Therefore, line-image data representing the image in lines can be generated to be transmitted to the inkjet printer 2 sequentially, as has been conventionally processed in a communication system including the PC 1 and the inkjet printer 2, whilst a volume of the print data to be transmitted to the inkjet printer 2 can be effectively compacted.

Furthermore, according to the communication system 100 described above, the halftone-dithered tone values can be classified into the segments, which correspond to the predetermined sizes of ink dots respectively on basis of a type of paper to be used in the print job. Accordingly, when a type of paper to be used is altered to another type and the correspondence between the tone values and the codes to be assigned is changed, the image represented by the print data generated in the PC 1 can be correctly printed in the inkjet printer 2.

According to the communication system 100 described above, moreover, the inkjet printer 2 is provided with the code assignment table 222 to store in the storage unit 22. Therefore, information indicating the correspondence between the tone values of the image and the codes to be assigned to the tone values is not included in the print data transmitted from the PC 1 to the inkjet printer 2. Thus, the volume of the print data to be transmitted to the inkjet printer 2 can be compacted even more efficiently.

Next, a second embodiment of the present invention will be described. Basic configuration of a communication system according to the second embodiment is similar to the communication system 100 according to the first embodiment except the driver's operation executed in the PC 1 and the printer's operation executed in the inkjet printer 2, which will be described in detail hereinbelow.

Figure 6:
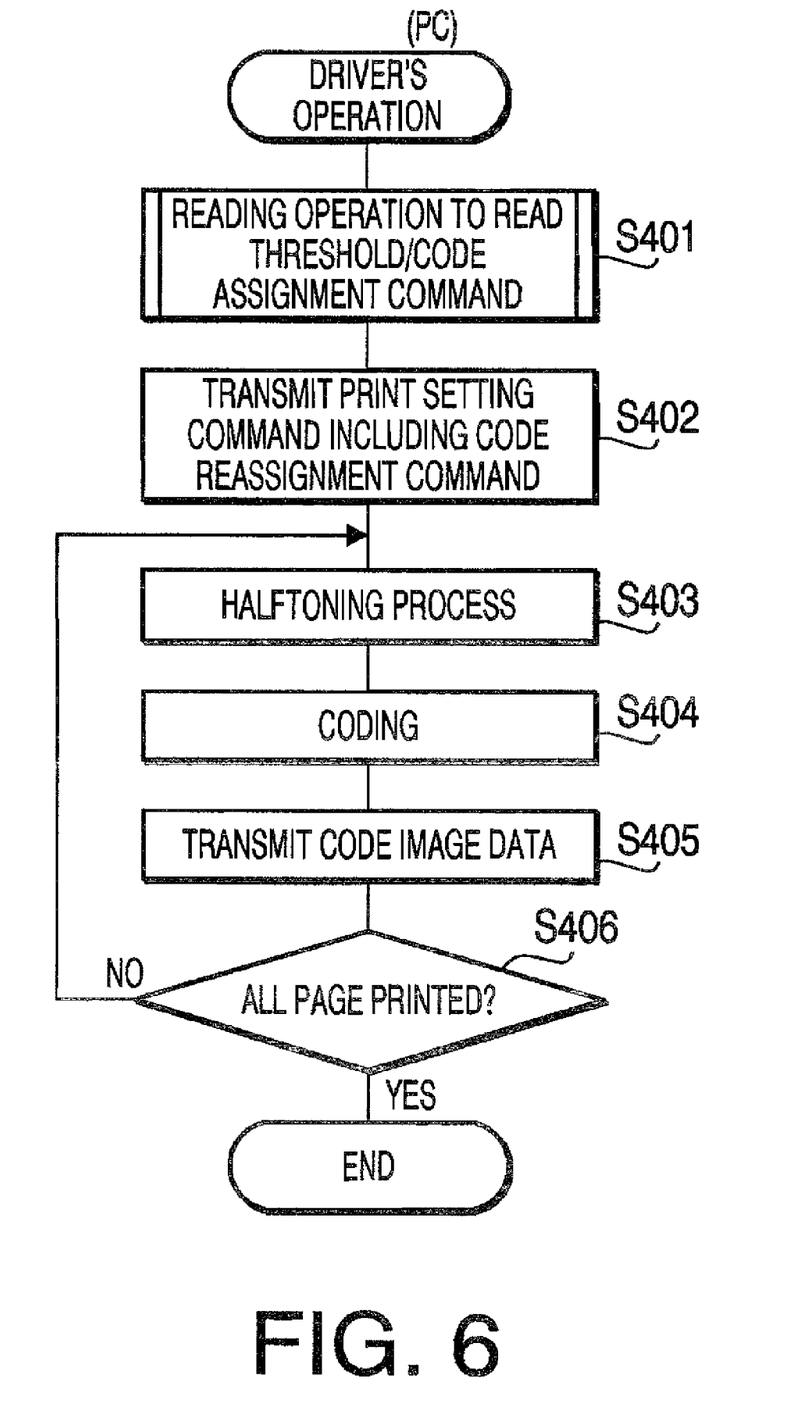
FIG. 6 is a flowchart to illustrate a flow of driver's behaviors according to a second embodiment of the present invention.

The driver's operation to be executed in the PC 1 according to the second embodiment will be described with reference to FIG. 6. In the driver's operation according to the second embodiment, behaviors in S401 and S403-S406 are identical to those in S101 and S103-S106 in the driver's operation according to the first embodiment (see FIG. 3). In other words, the driver's operation according to the second embodiment is different from the driver's operation according to the first embodiment in S402, which replaces S102.

In S402, a command for print settings including a command for code reassignment is transmitted to the inkjet printer 2. It is to be noted that, in S102 in the first embodiment, the command for print settings without the command for code reassignment is transmitted from the PC 1 to the inkjet printer 2.

The command for code reassignment indicates correspondence between tone values and codes to be assigned. Therefore, when the command for code reassignment is provided to the inkjet printer 2, the inkjet printer 2 can decode the print data with reference to the command, and it is not necessary that the inkjet printer 2 stores the code assignment table 222 in the storage unit 22.

Figure 7:
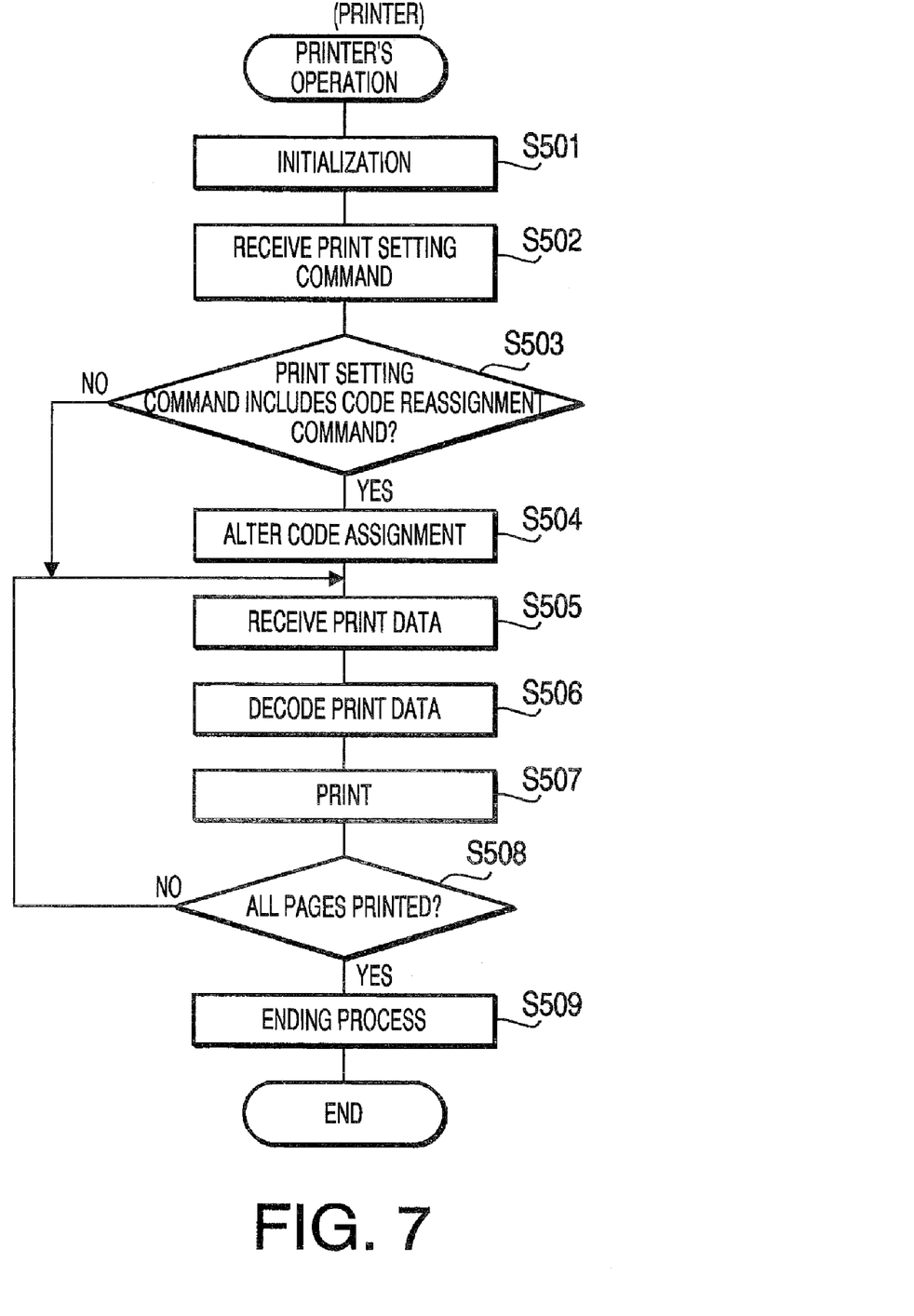
FIG. 7 is a flowchart to illustrate a flow of printer's behaviors according to the second embodiment of the present invention.

Next, the printer's operation to be executed in the inkjet printer 2 according to the second embodiment will be described with reference to FIG. 7. In the printer's operation according to the second embodiment, behaviors in S501, S502, and S505-S509 are identical to the behaviors in S301, S302, and S304-S308 (see FIG. 5). In other words, the printer's operation according to the second embodiment is different from the printer's operation according to the first embodiment in S503 and S504, which replace S303.

In S503, the control unit 21 judges as to whether the print setting command received in S502 includes the code reassignment command. If the code reassignment command is included (S503: YES), in S504, the control unit 21 alters default assignment of codes to the code assignment indicated in the code reassignment command. Thereafter, the flow proceeds to S505.

In S503, if the code reassignment command is not included (S503: NO), the flow skips S504 and proceeds to S505. According to this flow, the default code assignment is maintained. Normally, the code reassignment command is included in the print setting command, and the control unit 21 executes S504. However, even when the code reassignment command fails to be included in the print setting command in some reason, the judgment in S503 prevents the flow from being forced directly into an erroneous condition.

According to the communication system 100 in the second embodiment, specifically, the inkjet printer 2 is not necessarily required to have the code assignment table 222 stored. Therefore, storage medium (e.g., the storage unit 22) is prevented from being occupied by the code assignment table 222, and a storage area for the code assignment table 222 can be used efficiently. Specifically, resources in the inkjet printer 2 may often be limited; therefore, efficient use of the storage medium is advantageous.

Although an example of carrying out the invention has been described, those skilled in the art will appreciate that there are numerous variations and permutations of the image processing device and a computer readable storage medium that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the halftone-dithering according to the above embodiments, the 256-scaled tone values are downscaled into five-scaled tone values. However, a number of scales to be converted is not limited to 256, and/or a number of scales into which the original tone values are downscaled is not limited to 5. Further, the halftoning is not limited to random-dithering, and the difference between the tone value of the marked pixel and the tone values of unprocessed pixels is not necessarily distributed to the surrounding pixels.

For another example, in the above embodiments, the codes to be assigned to the tone values in the image data are altered according to the type of recording paper used in the print job. However, the codes to be assigned can be altered according to other print settings than the type of paper. Further, a single pattern of code assignment, i.e., fixed correspondence between the tone values and the codes, instead of a plurality of patterns, may be prepared. When a single pattern of code assignment is used, the information concerning the correspondence between the tone values and the codes is not necessarily provided from the PC 1 to the inkjet printer 2.

In the above embodiments, the inkjet printer 2 to form an image in four-colored (C, M, Y, K) inks in the inkjet method. However, for example, the inks to be used are not limited to the CMYK inks, but the inkjet printer 2 may use a larger number of different colored inks.

What is claimed is:

1. An image processing device capable of generating coded image data, the coded image data representing an image to be printed in a printing apparatus, comprising:

a data generator configured to downscale tone values of pixels included in the image in a halftoning process, the tone values of pixels being included in a predetermined scale range, and assign a plurality of types of codes having different lengths to the downscaled tone values to generate coded image data, which describes the downscaled tone values in the different types of codes; and a data transmitter configured to transmit the coded image data to the printing apparatus, wherein the data generator downscales the tone values of pixels in the image by classifying each tone value of pixels into one of segments, which are unevenly delimited by predetermined thresholds within the predetermined scale range inclusive of the tone values of pixels and include a larger segment and a smaller segment, and assigning a code with a shorter bit length to the tone value classified into the larger segment.

2. The image processing device according to claim 1,
wherein each of the downscaled tone values indicates a size of a dot to be formed on a recording medium by the printing apparatus;
wherein the data generator changes patterns of the segments according to a designated condition for printing the image; and
wherein the data transmitter transmits decoding information, which indicates correspondence between the tone values of pixels and the codes to be assigned to the tone values, along with the coded image data to the printing apparatus.

3. The image processing device according to claim 2,
wherein the data generator changes the patterns of the segments according to a type of recording medium, on which the image is printed by the printing apparatus.

4. The image processing device according to claim 2,
wherein the image data represents the image to be formed in ink by the printing apparatus; and
wherein the type of recording medium depends on ink-absorbability of the recording medium.

5. The image processing device according to claim 1,
wherein the tone values of pixels to be downscaled are included in a scale range of 256; and
wherein the data generator downscales the tone values of pixels in 256 scales into 5 scales.

6. The image processing device according to claim 1, further comprising:
a storage unit to store coding information, which indicates correspondence between the tone values of pixels and the codes to be assigned to the tone values, and the thresholds to delimit the segments within the predetermined scale range inclusive of the tone values of pixels.

7. An image processing system comprising an image processing device to generate coded image data representing an image to be printed and a printing apparatus to print the image according to the coded image data generated in the image processing device,
wherein the image processing device includes:
a data generator configured to downscale tone values of pixels included in the image in a halftoning process, the tone values of pixels being included in a predetermined scale range, and assign a plurality of types of codes having different lengths to the downscaled tone values to generate coded image data, which describes the downscaled tone values in the different types of codes; and
a data transmitter configured to transmit the coded image data to the printing apparatus,
wherein the data generator downscales the tone values of pixels in the image by classifying each tone value of pixels into one of segments, which are unevenly delimited by predetermined thresholds within the predetermined scale range inclusive of the tone values of pixels and includes a larger segment and a smaller segment, and assigning a code with a shorter bit length to the tone value classified into the larger segment;
wherein the printing apparatus includes:
a data receiver to receive the coded image data transmitted by the data transmitter;
a decoder to decode the coded image data described in the different types of codes with reference to decoding information, the decoding information indicating correspondence between the tone values and the codes to be assigned to the tone values; and
a printer unit to form the image according to the decoded image data.

8. The image processing system according to claim 7,
wherein the image processing device further includes a storage unit to store the decoding information;
wherein the data transmitter transmits the decoding information along with the coded image data to the to the printing apparatus;
wherein the data receiver receives the decoding information along with the coded image data transmitted by the data transmitter; and
wherein the decoder decodes the coded image data with reference to the decoding information received by the data receiver along with the coded image data.

9. The image processing system according to claim 7,
wherein the printing apparatus further includes a storage unit to store the decoding information; and
wherein the decoder decodes the coded image data with reference to the decoding information stored in the storage unit.

10. The image processing system according to claim 7,
wherein each of the downscaled tone values indicates a size of a dot to be formed on a recording medium by the printing apparatus; and
wherein the printer unit forms the image by forming dots, of which sizes are represented by the downscaled tone values decoded by the decoder.

11. The image processing system according to claim 10,
wherein the data generator changes patterns of the segments according to a designated condition for printing the image; and
wherein the patterns of the segments depend on a type of recording medium on which the image is printed by the printing apparatus.

12. The image processing device according to claim 11,
wherein the image data represents the image to be formed in ink by the printing apparatus; and
wherein the type of recording medium depends on ink-absorbability of the recording medium.

13. The image processing system according to claim 7,
wherein the tone values of pixels to be downscaled are included in a scale range of 256; and
wherein the data generator downscales the tone values in 256 scales into 5 scales.

14. A non-transitory computer readable medium storing computer readable instructions that control a computer to process an image by executing steps of:
downscaling tone values of pixels included in the image and assigning a plurality of types of codes having different lengths to the downscaled tone values to generate coded image data, which describes the downscaled tone values in the different types of codes, the tone values of pixels being included in a predetermined scale range; and
transmitting the coded image data to the printing apparatus,
wherein the tone values of pixels in the image is downscaled by classifying each tone value of pixels into one of segments, which are unevenly delimited by predetermined thresholds within the predetermined scale range inclusive of the tone values of pixels and includes a larger segment and a smaller segment, and assigning a code with a shorter bit length to the tone value classified into the larger segment.

* * * * *